Aug. 9, 1932.   G. R. BAKER ET AL   1,870,480
APPARATUS FOR MAKING OR BAKING WAFERS AND THE LIKE
Filed Jan. 6, 1930   3 Sheets-Sheet 1

INVENTORS
George Ralph Baker
BY John Currie Paterson
George J. Wilcox
ATTORNEY

Aug. 9, 1932.  G. R. BAKER ET AL  1,870,480
APPARATUS FOR MAKING OR BAKING WAFERS AND THE LIKE
Filed Jan. 6, 1930   3 Sheets-Sheet 3

INVENTOR
George Ralph Baker
BY John Currie Paterson
ATTORNEY

Patented Aug. 9, 1932

1,870,480

UNITED STATES PATENT OFFICE

GEORGE RALPH BAKER AND JOHN CURRIE PATERSON, OF WILLESDEN, LONDON, ENGLAND, ASSIGNORS TO BAKER PERKINS COMPANY INC., OF SAGINAW, MICHIGAN

APPARATUS FOR MAKING OR BAKING WAFERS AND THE LIKE

Application filed January 6, 1930, Serial No. 418,678, and in Great Britain January 9, 1929.

This invention relates to apparatus or machines for making or baking wafers and the like, more especially flat wafers which are usually associated with ice-cream, and has reference to known apparatus or machines wherein a train or series of double mould members are arranged and moved in a circuit which may be a rotary one about an axis and which has a gap or open sector across which the members are in turn transferred from one end of the train to the other.

An object of the present invention is to provide an improved machine of simplified construction wherein the delivery of the product and supply of batter or other material are facilitated.

A further object of the invention is to provide improved means for transmitting motion to the mould members throughout circuitous paths and for transferring such across the gap or open sector.

Another object of the invention is to provide a machine having a compact arrangement of mould elements and one adapted to economize in fuel for mould heating purposes.

According to the invention the mould members are given a movement the direction of which is such that the moulds approach the delivery position in the region between 180° and 270° of a circle (i. e. using a clock face analogy with 12 o'clock as zero) and preferably such that a mould is open for delivery in the neighborhood of a position of 210°.

The gap or sector opening may be located or extend from the 180° position or something more than 180° (say 220°) to a somewhat greater angle than 270° (say 300°).

This arrangement not only affords a very convenient delivery angle but also enables a substantially horizontal batter feeding position to be adopted.

A further feature of the invention consists in providing transfer means adapted to transfer a mould element from the delivery end of the train, comparatively rapidly, to a position of rest or substantial rest, approximating to the horizontal, and thereafter to displace such to the other end of the train for commencement of the cycle.

The invention also comprises the transmission of motion to the moulds through means as described in our co-pending U. S. Patents Nos. 1,744,497 and 1,763,211 by communicating a drive to one or other of the pinions concerned in the means for maintaining the train in close order and the moulds locked or closed during the baking cycle.

Further features of invention will be hereinafter described and defined in the claims.

In the accompanying drawings, illustrating a flat wafer machine according to the invention:

Figure 1 is a side elevation, while

Figure 1:
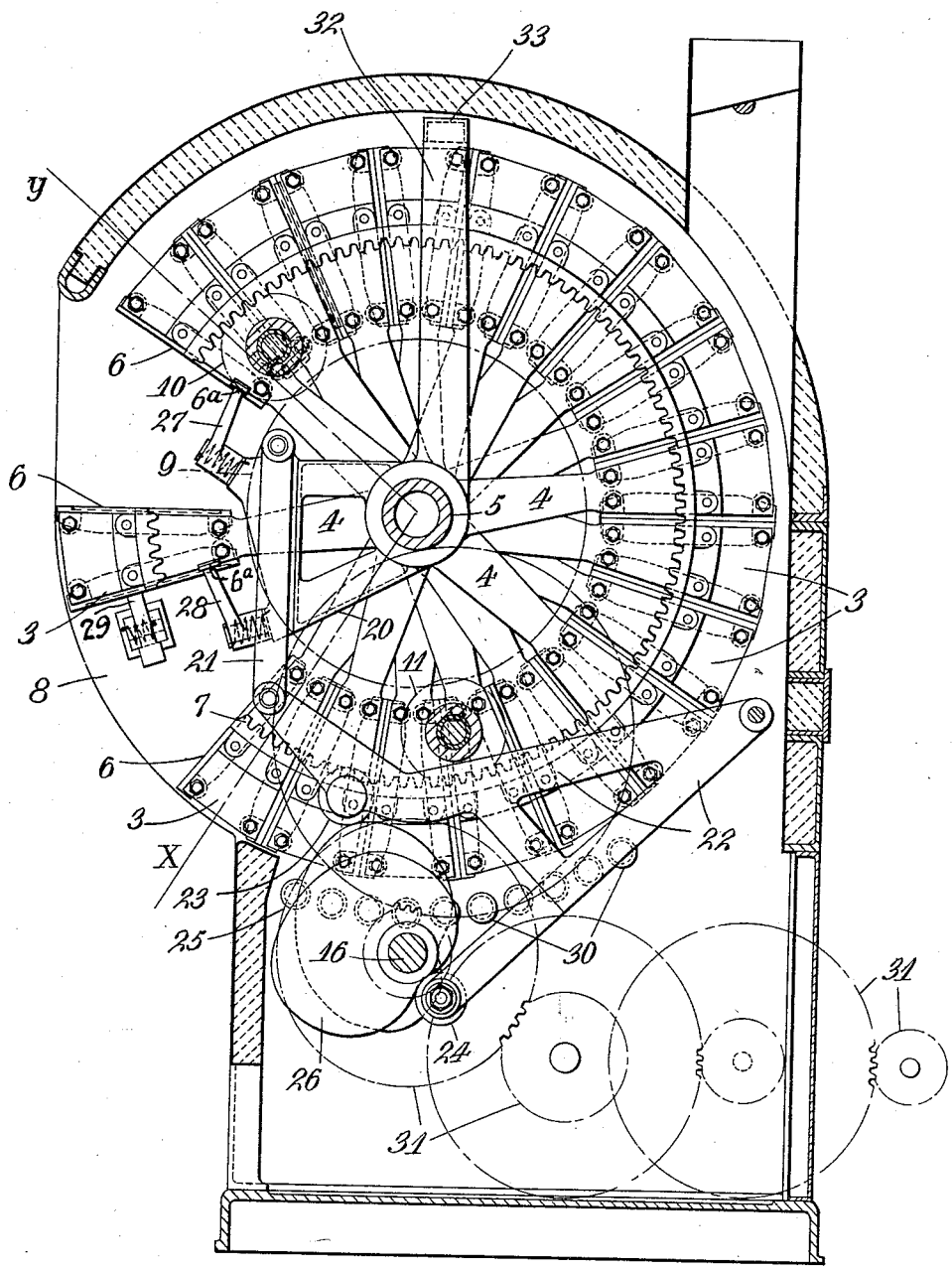

In carrying the invention into effect according to one convenient mode, by way of example, a series of double mould members 3 is provided, each mounted upon spokes or radial arms 4 revoluble about a hub or shaft 5. The mould members are provided on each radial face 6 with a mould element or cavity suitable for producing, in conjunction with another mould member, a mould suitable for a flat wafer, that is to say, each pair of members includes between their opposing faces a flat wafer mould cavity. The mould elements are of sector form and are provided with segmental toothed rack elements 7 at each side thereof which, when the members are abutted one against the other, constitute continuous racks extending over the major arc of a circle.

The members are arranged as a train or closely abutting series and the arrangement and number of members is such that the circle is incomplete and comprises a gap or sector-shaped opening 8 across which the members are transferred from one end of the train to the other. The machine is designed so that this gap, measuring from the centre line X of the mould member at one end of the train to the centre line Y of the mould at the other end of the train, embraces an angle of approximately 100° or somewhat less, the size of the gap depending upon the width and number of the moulds, also taking into consideration the space necessary for feeding batter and for manipulating the delivery or discharge of the wafers.

The continuous travel of the closed moulds about the main shaft 5 of the machine is imparted by two substantially identical mechanisms, one at each side of the machine, one of which will now be described. A cog 10 is located adjacent the commencement of the train of moulds, and a similar cog 11 is located toward the delivery end of the train. These cogs are adapted to engage the rack elements 7 on the mould members and are mounted so as to exert a resilient stress upon the assembled train and keep the mould members in close order and the moulds properly closed. The resilient means for producing this effect may be constructed after the manner described in the co-pending patents previously referred to.

Figure 2:
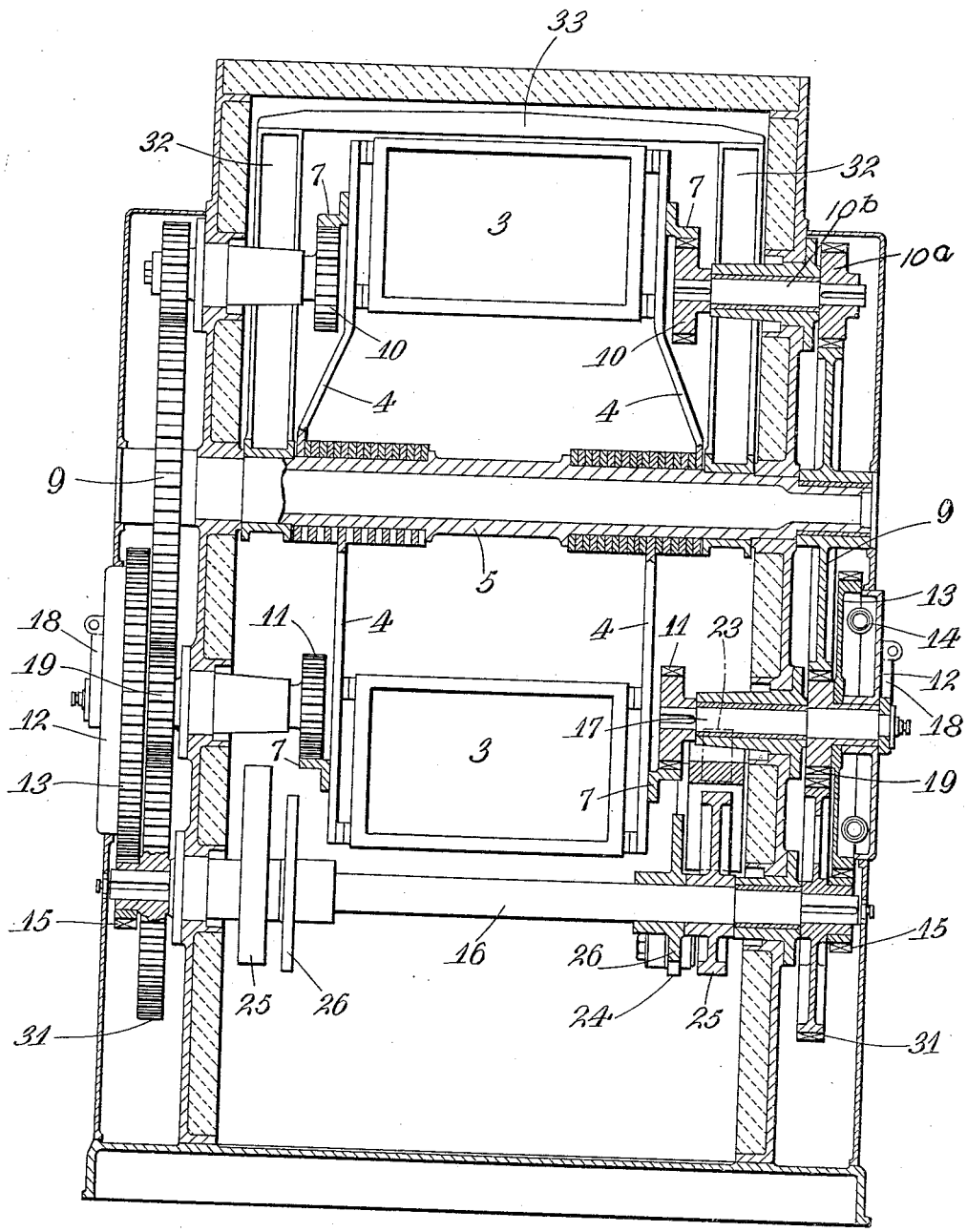
Figure 2 is a sectional elevation at right angles thereto.
Figure 5:
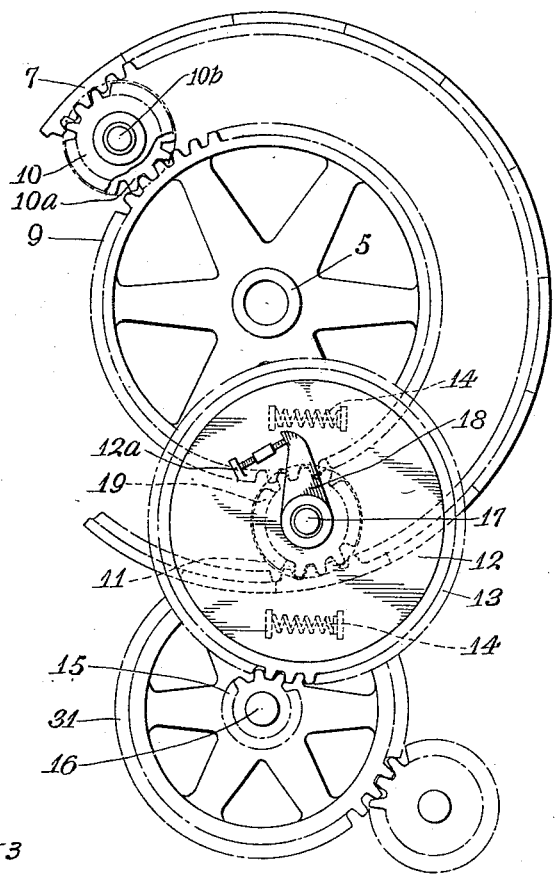
Fig. 5 is a diagrammatic side elevation showing the mechanism for imparting continuous movement to the train of molds.
Figure 3:
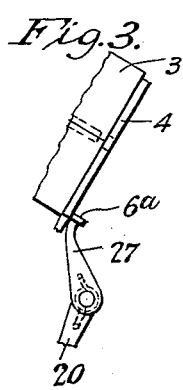
Fig. 3 is a fragmentary front elevation showing the mould-carrying pawl at the right side of the machine, and the lug on the mould which it engages.
Figure 4:
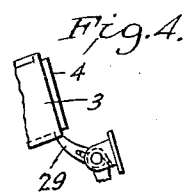
Fig. 4 is a fragmentary front elevation showing a stationary pawl or latch which supports the mould midway of the gap.

Referring to Figs. 2 and 5, cog 11 is driven through a resilient member consisting essentially of a pair of coaxial discs 12, 13 rotatable on shaft 17 relative to one another, but yieldingly connected by springs 14. Their operative relationship to the driving gear train is as follows: Disc 13 is formed as a spur wheel, rotably mounted on shaft 17, and driven by a pinion 15 fixed to cam shaft 16. Cam shaft 16 is driven through reduction gears 31 which are proportioned to produce the desired speed of operation.

Disc 13 drives disc 12 through its yielding connection 14. Disc 12 is provided with a lug 12a which engages an arm 18 fixed to shaft 17 and so drives shaft 17 in a clockwise rotation, as viewed in Fig. 5. The cog 11 is fixed to shaft 17, and because of the tension of springs 14 in its resilient driving connection to the cam shaft 16, it yieldingly resists the advance of the train of molds 3.

The driving force is applied to the molds 3 at the commencement of the train by cog 10 which meshes with rack elements 7 and which is fixed on a rotatable shaft 10b. A second cog 10a also fixed to shaft 10b meshes with pinion 9 rotatably mounted on the main shaft 5 of the machinery. Pinion 9 is driven by a spur wheel 19 coaxially fixed to the positively driven disc 13.

The 100° sector referred to above is positioned in the region (considering an end elevation of the machine) between about 210° and 310° in circular measurement, or as may be said, roughly between 7 o'clock and 10 o'clock, so that with the moulds of the number and relative dimension as shown, the actual gap between the end and commencement of the train is approximately 80°.

Transfer means are provided for displacing the moulds 3 from the end of the train (7 o'clock position) across the gap 8 to the 10 o'clock position, with a pause or arrestment in the horizontal or 9 o'clock position (see Figure 1) for the purpose of affording a convenient position for filling or charging the moulds with batter.

One convenient transfer means comprises a pair of arms or frames 20 located on each side of the machine and pivotally mounted on the hub 5. The frames are connected by links 21 to rocker levers or A frames 22, carrying rollers 23, 24, adapted to co-operate with rotary cams 25, 26, mounted on the cam shaft 16, the surfaces of the cams being designed to produce in the side arms 20 an appropriate upward motion which in the initial stage is accelerated to a comparatively quick rate of movement of the train of moulds, whereby a quick opening of the mould at the end of the train is obtained, followed by a slow upward movement, during which period the closed mould at the "commencement" is "followed up" until meshing of the gears is effected. The transfer frames 20 are provided with pairs of pawls or detents 27, 28, which are pivotally mounted and provided with spring means which normally tend to thrust them inwardly towards the moulds, the arrangement being such that each of the pair of pawls is adapted to engage a lug 6a upon each side of the mould member.

A third pair of pawl elements or other means may be provided for temporarily holding the moulds in the horizontal position of rest or mould filling position. For example, a pair of pawl elements 29 may be located one upon either side of the machine and secured to the side frames or other convenient fixture, the pawls being adapted to engage the sides of the moulds.

The transfer arms or frames 20 are connected or yoked together by the upwardly extending arms 32 coupled by the cross piece 33, whereby the pressure of the arms 20 on the hub 5 is equalized.

The cam shaft 16 is driven through suitable reduction gears 31 to produce the desired speed of operation.

In operation, upon the downward swing of the transfer element 20, the lowermost pawls 28 engage the mould 3 at the delivery end of the train and at the same time the upper pair of pawls 27 engages the mould which is lying in the horizontal or filling position, temporarily held by the stationary pawls 29. It will be observed that the movement of a mould member to the horizontal position opens the next mould at the delivery end and exposes the wafer so that such can be removed by the attendant.

Under the action of the cam 25 the transfer radial members 20 are given the desired upward movement and as the pawls 27, 28 are engaged with a pair of mould members, as indicated above, this upward movement transfers the mould which has lain in the horizontal position to the commencement end of the train so that its segmental racks 7 are meshed with the teeth of the cog wheel 10 at this end of the train, while the mould member from which the wafer has been removed at the delivery end of the train is moved into the horizontal and takes the place of the member which has just vacated that position. This operation is constantly repeated so that each mould member in turn is transferred from the delivery end to the commencement of the cycle in succession while pausing at the 9 o'clock or horizontal position for reception of a charge of batter.

It is preferred to provide positive downward movement of the transfer member 20 by the cams 26 but it is obvious that such cam may be dispensed with and the downward movement effected by gravity or a grooved came disc may be provided.

The supply of batter to the moulds may be effected by the attendant by hand manipulation but it is preferred to provide an automatic charging device which is adapted to supply a charge of batter to each of the half moulds as it lies in the horizontal position, the operation of the automatic supply device synchronizing with the presentation of the mould at the 9 o'clock position.

The mould members may be constructed in a more or less open or skeleton form between the radial plate or faces to facilitate heating the moulds as they pass along the baking circuit. Any suitable form of heating may be utilized; thus, gas jets 30 may be disposed to play upon the moulds, or electrical or steam heating means may be employed.

While transfer means in the form of swinging arms and pawls have been described above, it will be understood that other means might be devised for this purpose, and alternatively to provide a stationary pawl device for holding the moulds in the horizontal position a second cam device might be employed so that the work of transferring the moulds in two stages may be taken care of or distributed between a pair of cam elements, links means or other equivalent device for producing the required motion.

We claim:

1. A machine for making or baking wafers and the like comprising a train of double mould members arranged and moved in a circuit about an horizontal axis and having a gap or open sector extending from approximately the 220° position to the 300° position, across which the members are in turn transferred from one end of the train to the other, transfer means for moving a member from the delivery end at the 220° position, comparatively rapidly, to a position of rest or substantial rest, and thereafter displacing said member to the other end of the train for commencement of the circuit.

2. In a machine for baking wafers and the like comprising an horizontal axis, a train of mould elements arranged for movement about said horizontal axis, and having a gap or open sector across which the elements are in turn transferred from one end of the train to the other, a frame oscillatable about said horizontal axis, actuating means for oscillating said frame through one-half the arc of said open sector, two mould-engaging pawls carried by said frame and spaced apart an angular distance equal to one half the arc of said open sector, one of said pawls arranged to engage the last mould in said train and carry it half-way across said open sector during the forward movement of said frame, means for holding said mould in position half way across said open sector during the return movement of said frame and pawl, the second of said pawls arranged to engage said mould in said half-way position and carry it to the beginning of said train while said first pawl is carrying a second mould from the end of said train to said half-way point.

3. A machine for making or baking wafers and the like comprising a train of mould elements arranged for movement about a horizontal axis and having a gap or open sector across which the elements are in turn transferred from one end of the train to the other, transfer mechanism by which the element is moved from the delivery end of the train toward a horizontal or substantially horizontal position, means temporarily halting the mould in such position, and means operating thereafter to move the element upwardly into engagement with a mould element at the commencement of the train.

4. A machine for making or baking wafers and the like comprising a train of mould elements movable about an axis and having a gap or open sector across which the elements are transferred from one end of said train to the other, transfer mechanism by which each element is moved in turn from the delivery end of the train toward a position substantially midway of said gap, means arranged to engage and temporarily check the travel of the element at such position, and means operatively engaging said element and actuated to move it thereafter into engagement with a mould element at the commencement of the train.

5. A machine for making or baking wafers and the like comprising a train of mould elements movable about an axis and having a gap or open sector, transfer mechanism operating to engage each element in turn and transfer it from the delivery end of the train toward and into engagement with a mould element at the commencement of the train, a stop located substantially midway of said gap and arranged to engage the element and temporarily check its travel during said transfer movement.

6. A machine for making or baking wafers and the like comprising a train of mould elements movable about an axis and having a gap or open sector, transfer mechanism operating to engage each element in turn and transfer it from the delivery end of the train toward and into engagement with a mould element at the commencement of the train, said transfer mechanism including means for temporarily checking the travel of the element substantially midway of said gap, thereby dividing the travel into two stages.

7. A machine for making or baking wafers and the like comprising a train of mould elements movable about a horizontal axis and having a gap or open sector, transfer mechanism operating to engage each element in turn and transfer it from the delivery end of the train toward and into engagement with a mould element at the commencement of the train, said transfer mechanism including means for temporaily checking the travel of the element substantially midway of said gap and in a substantially horizontal position, thereby dividing the travel into two stages.

8. A machine for making or baking wafers and the like comprising a train of mould elements movable about an axis and having a gap or open sector, a transfer frame oscillatable about said axis, a mould-engaging transfer detent carried by said frame and operable from the delivery end of the train to a position substantially midway of the gap, and a second detent on the frame operable from said mid-position to the commencement of the train.

9. A machine for making or baking wafers and the like comprising a closed train of double-faced mould members movable about a horizontal axis and having a gap or open sector between the moulds on one side of the vertical plane of said horizontal axis and enclosing an angle less than 180°, and transfer means for moving said mould members one by one upwardly across said gap from one end of said closed train to the other, whereby the closed mould members at the end of the train are separated below the horizontal for discharge of the wafer between them and the leading faces of the mould members, as they are carried across said gap, are presented in turn in a horizontal position for the reception of a fresh charge of batter, and thereafter are moved to the commencement of the train into engagement with a mould face inclined downwardly substantially away from the vertical.

10. A machine as claimed in claim 9, wherein the said transfer means includes a cam actuating-means designed to move said mould elements at a decreasing rate of speed as they near the commencement end of the train so that each is closed slowly upon the preceding mold.

11. A machine as claimed in claim 5, wherein the said transfer mechanism includes a cam actuating-means designed to move said mould elements at a decreasing rate of speed as they near the commencement end of the train so that each is closed slowly upon the preceding mould element.

In testimony whereof we have signed our names to this specification.

GEORGE RALPH BAKER.
JOHN CURRIE PATERSON.